United States Patent
Boev et al.

(10) Patent No.: US 11,601,637 B2
(45) Date of Patent: Mar. 7, 2023

(54) MULTIFOCAL DISPLAY DEVICES AND METHODS

(71) Applicant: Huawei Technologies Co., Ltd., Shenzhen (CN)

(72) Inventors: Atanas Boev, Munich (DE); Panji Setiawan, Munich (DE); Bogdan Cihodariu Ionita, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/156,105

(22) Filed: Jan. 22, 2021

(65) Prior Publication Data

US 2021/0144360 A1    May 13, 2021

Related U.S. Application Data

(63) Continuation of application No. PCT/EP2018/070525, filed on Jul. 30, 2018.

(51) Int. Cl.
*H04N 13/322*    (2018.01)
*H04N 13/194*    (2018.01)
(Continued)

(52) U.S. Cl.
CPC .......... *H04N 13/322* (2018.05); *G02B 3/14* (2013.01); *H04N 13/194* (2018.05); *H04N 13/398* (2018.05)

(58) Field of Classification Search
CPC .. H04N 13/322; H04N 13/194; H04N 13/398; H04N 19/88; H04N 19/597;
(Continued)

(56) References Cited

U.S. PATENT DOCUMENTS 7,477,284 B2 *  1/2009  Peleg ................... H04N 13/282
                                                348/53
8,641,621 B2 *  2/2014  Razzaque .......... A61B 18/1477
                                                600/407
(Continued)

OTHER PUBLICATIONS

"DLP Technology for Near Eye Display," Application Report, White Paper, Texas Instruments Incorporated, pp. 1-18 (Sep. 2014—Revised Aug. 2017).
(Continued)

*Primary Examiner* — Tung T Vo
(74) *Attorney, Agent, or Firm* — Leydig, Voit & Mayer, Ltd.

(57) ABSTRACT

An image transmission device of a multifocal display system is described, for transmitting a set of N composite images based on a set of N primary images to an image reception device. N is greater or equal 2, and each of the N primary images has a focus distance associated therewith. The image transmission device includes processing circuitry configured to partition each of the N primary images into image portions and generate the N composite images by placing each image portion of each of the N primary images into one of the N composite images such that each of the N composite images comprises image portions from two or more of the N primary images. A communication interface transmits the N composite images to the image reception device (103).

12 Claims, 11 Drawing Sheets

(51) Int. Cl.
*H04N 13/398* (2018.01)
*G02B 3/14* (2006.01)

(58) Field of Classification Search
CPC .. H04N 13/344; H04N 13/161; H04N 19/895; G02B 3/14
USPC .......................................................... 348/51
See application file for complete search history.

(56) References Cited

U.S. PATENT DOCUMENTS

| | | | | |
|---|---|---|---|---|
| 8,798,339 | B2* | 8/2014 | Mielekamp | A61B 34/10 |
| | | | | 382/128 |
| 10,474,414 | B2* | 11/2019 | Ogawara | H04N 9/3147 |
| 2003/0140347 | A1 | 7/2003 | Varsa | |
| 2011/0249149 | A1* | 10/2011 | Ishida | H04N 5/2628 |
| | | | | 348/239 |
| 2013/0051685 | A1* | 2/2013 | Shechtman | G06V 10/56 |
| | | | | 382/218 |
| 2013/0229529 | A1* | 9/2013 | Lablans | H04N 5/23238 |
| | | | | 348/169 |
| 2016/0147078 | A1* | 5/2016 | Bedard | G02B 13/0095 |
| | | | | 345/6 |
| 2016/0148416 | A1* | 5/2016 | Wu | H04N 13/395 |
| | | | | 345/419 |
| 2016/0191905 | A1* | 6/2016 | Robinson | H04N 5/232133 |
| | | | | 348/46 |
| 2018/0343431 | A1* | 11/2018 | Veldandi | H04N 13/207 |

OTHER PUBLICATIONS

Kramida, "Resolving the Vergence-Accommodation Conflict in Head-Mounted Displays," IEEE Transactions on Visualization and Computer Graphics, vol. 22, No. 7, pp. 1912-1931, Institute of Electrical and Electronics Engineers, New York, New York (Jul. 2016).

Lambooij et al., "Visual Discomfort and Visual Fatigue of Stereoscopic Displays: A Review," in Journal of Imaging Science and Technology, vol. 53, No. 3, pp. 1-14 (2009).

Hu et al., "Design and Assessment of a Depth-Fused Multi-Focal-Plane Display Prototype," Journal of Display Technology, vol. 10, No. 4, pp. 308-316 (Apr. 2014).

Wu et al., "Content-adaptive focus configuration for near-eye multifocal displays," vol. 1, ICME 2016, pp. 1-6 (Year: 2016).

Narain et al., "Optimal Presentation of Imagery with Focus Cues on Multi-Plane Displays," ACM Transactions on Graphics, vol. 34, No. 4, Article 59, pp. 1-12 (Publication Date: Aug. 2015).

Shibata et al., "The zone of comfort: Predicting visual discomfort with stereo displays," J Vis. 2011; 11 (8), total 53 pages (2011).

Liu et al., "Depth Image-Based Temporal Error Concealment for 3-D Video Transmission," IEEE Transactions on Circuits and Systems for Video Technology, vol. 20, No. 4, pp. 600-604, Institute of Electrical and Electronics Engineers, New York, New York (Apr. 2010).

\* cited by examiner

MULTIFOCAL DISPLAY DEVICES AND METHODS

CROSS-REFERENCE TO RELATED APPLICATIONS

This application is a continuation of International Application No. PCT/EP2018/070525, filed on Jul. 30, 2018, the disclosure of which is hereby incorporated by reference in its entirety including any references contained therein.

TECHNICAL FIELD

The invention relates to the field of personal display devices. More specifically, the invention relates to a multifocal display system and method, in particular an image transmission device and an image reception device of a multifocal display system.

BACKGROUND

Personal display devices make it possible to provide image content to a viewer in applications where the use of conventional display screens would be an encumbrance. Head-mounted display (HMD) devices (also referred to as near-eye display (NED) or near-to-eye (NTE) devices), such as display goggles, are being considered as a useful type of wearable personal display device usable in a variety of fields, with applications ranging from military, medical, dental, industrial, and game presentation, among others. For many of these applications it can be advantageous to have a three-dimensional (3D) or stereoscopic display. However, stereoscopic displays conventionally suffer from mismatched convergence and accommodation cues. This conflict hinders visual performance and causes visual fatigue.

Multifocal displays (MFDs) are one approach that has attempted to address the convergence-accommodation conflict. MFDs typically use rapid temporal (i.e., time multiplexed) and focal modulation of a series of 2-dimensional (2D) images to render 3D scenes. This series of images is typically focused at parallel planes positioned at different, discrete distances from the viewer. The number of focal planes directly affects the viewers' eye accommodation and 3D perception quality of a displayed scene.

Usually, in conventional MFDs the series of 2-dimensional (2D) images is provided from an image generator to an image display controller for displaying the images at different focal planes. In the absence of any transmission errors, where the images are not exposed to any kind of error sources between the image generator (i.e., the source of the images) and the image display controller, those images can be displayed properly. If, however, the transmission channel is imperfect, the images may be corrupted or lost, and the image quality will suffer substantially.

Thus, there is a need for improved multifocal display devices and methods allowing a better handling of image sequences affected by transmission errors.

SUMMARY

Illustrative examples according to the disclosure are defined by the features of the independent claims, and further advantageous implementations of the embodiments by the features of the dependent claims.

Generally, illustrative examples of the disclosure are based on the idea to apply an error concealment scheme to the images in a time-multiplexed MFD system. Once the error concealment scheme has been applied, any further conventional error concealment method can be applied. According to embodiments of the invention the error concealment is implemented by partitioning the image area for each focal plane and combining the image parts corresponding to all focal planes (depths) into one composite image frame to be transmitted. The partitioning may be arbitrary and based on several aspects such as the depth maps. In this way, each transmitted image contains image parts coming from (preferably) all different focal plane images. In other words, each focal plane image is distributed across several transmitted image frames.

As used herein, when referring to a first image and a second image which have the same size and shape, the statement that a portion of the first image and a portion of the second image are "corresponding portions" or that they "correspond to each other" means that the two image portions overlap each other when the two images are stacked atop each other. In other words, corresponding portions of different images are identical in size, shape and position within the respective image.

More specifically, according to a first aspect the disclosure relates to an image transmission device, i.e., an image source of a multifocal display system for transmitting a set of N composite images based on a set of N primary images to an image reception device, in particular a display controller of the multifocal display system with N greater than or equal 2. Each of the N primary images has a focus distance associated with it. The image transmission device comprises: processing circuitry configured to partition each of the N primary images into a plurality of image portions and to generate the N composite images by placing each image portion of each of the N primary images into one of the N composite images such that each of the N composite images comprises image portions from two or more of the N primary images; and a communication interface configured to transmit the N composite images to the image reception device.

In other words, the content of the N primary images is distributed over the N composite images. When no composite image is lost or corrupted, the set of composite images available to the image reception device will comprise the N composite images provided by the image transmission device (and thus the whole image content of the N primary images). The image reception device can then reconstruct the N primary images from the N available composite images exactly (i.e., with no loss in image quality). When one or more composite images are lost or corrupted (e.g., in the course of transmitting them to the image reception device), these lost or corrupted composite images will not be available for reconstructing the primary images. In other words, they are not included in the set of composite images available to the image reception device. In this case, i.e., when the set of composite images available to the image reception device comprises one or more but not all of the N composite images send by the image transmission device, the image reception device can reconstruct the N primary images from the set of available composite images in an approximate manner, e.g., by inter- or extrapolation.

Thus, illustrative examples of the disclosure provide an error concealment scheme, where images are modified in such a way that when the image sequence is sent, artifacts in the rendered image that are caused by transmission channel errors will be less noticeable. Advantageously, compared to conventional schemes a much smaller artifact can be observed when an error corrupts one of the images in the sequence.

In an illustrative example, the image portions of the N primary images are placed into the composite images such that each composite image comprises image portions from all the N primary images. This minimizes the loss in image quality when one of the composite images is lost or corrupted.

In an illustrative example, the N primary images are identical in size and shape. This facilitates transforming the N primary images into the N composite images and transforming the N composite images back into the N primary images.

In a further possible implementation form of the first aspect, the processing circuitry is configured to place any two image portions of any one of the N primary images into different composite images if the two image portions are adjoining image portions. In other words, adjoining image portions of a primary image can be placed into different composite images. Two image portions are considered adjoining if they share a common boundary. Two image portions which share merely a point (e.g., a corner point) are not considered adjoining. Thus, if one the two image portions is lost or corrupted (e.g., due to loss or corruption of the composite frame which contains this image portion), the other image portion can be reconstructed by inter- or extrapolation of neighboring image portions contained in composite frames that have not been lost.

In a further possible implementation form of the first aspect, the communication interface is configured to transmit the N composite images in a predefined sequence to the image reception device. Advantageously, this allows the image reception device to identify each composite image based on the position of that composite image in the received sequence of composite images, and no further information for distinguishing the composite images from each other needs to be provided to the image reception device. In an embodiment, the N primary images are images of a video frame, the video frame is an element of a sequence of video frames, and the predefined sequence is the same in every frame of the sequence of video frames.

In a further possible implementation form of the first aspect, the processing circuitry is configured to place any two corresponding image portions of any two of the N primary images into different composite images. This facilitates reconstruction of the primary images by the image reception device when the set of composite images available to the image reception device is incomplete (i.e., when not all of the N composite images have been received by the image reception device).

In a further possible implementation form of the first aspect, the N primary images are identical in size and shape, wherein the processing circuitry is configured to partition the N primary images into image portions in the same manner. In other words, the geometrical layout of image portions can be the same in each of the N primary images. Each image portion of each of the N composite images can thus be filled with the corresponding image portion of one of the N primary images.

In a further possible implementation form of the first aspect, the processing circuitry is configured to place each image portion of each of the primary images at the same position within the composite image as in the primary image. Thus a simple and efficient transformation from primary to composite images is provided.

In a further possible implementation form of the first aspect, the image portions of the N primary images have a rectangular or quadratic shape.

In a further possible implementation form of the first aspect, the image portions of the N primary images are pixels.

In a further possible implementation form of the first aspect, the N primary images are images of a video frame. It is understood that the video frame is part of a sequence of video frames. The sequence of video frames provides an animated picture (i.e., a moving picture).

According to a second aspect the disclosure relates to a corresponding image transmission method for transmitting a set of N composite images based on a set of N primary images to an image reception device, wherein N is greater or equal 2 and wherein each of the N primary images has a focus distance associated with it. The image transmission method comprises the following steps: partitioning each of the N primary images into a plurality of image portions; generating the N composite images by placing each image portion of each of the N primary images into one of the N composite images such that each of the N composite images comprises image portions from two or more of the N primary images; and transmitting the N composite images to the image reception device.

The method according to the second aspect of the disclosure can be performed by the image transmission device according to the first aspect of the invention. Further features of the method according to the second aspect of the invention result directly from the functionality of the image transmission device according to the first aspect of the invention and its different implementation forms described above and below.

According to a third aspect, the disclosure relates to an image reception device, e.g. a display controller of a multifocal display system, for receiving a set of composite images from the image transmission device according to the first aspect of the invention. The image reception device comprises: a communication interface configured to receive the set of composite images from the image transmission device, wherein the composite images are based on a set of N primary images, wherein N is greater or equal 2, wherein each of the N primary images has a focus distance associated with it and wherein each of the composite images comprises image portions from two or more of the N primary images; and processing circuitry configured to reconstruct the N primary images from the set of composite images by placing each image portion of each of the composite images into one of the N primary images.

In a further possible implementation form of the third aspect, the processing circuitry is configured to reconstruct the N primary images in an approximate manner from the set of composite images when the set of composite images includes one or more but less than N composite images, i.e., in case not all N composite images generated and transmitted by the image transmission device have been received by the image reception device.

In a further possible implementation form of the third aspect, the processing circuitry is configured to reconstruct the N primary images in an approximate manner by reconstructing a missing image portion of one of the N primary images based on one or more available image portions. As used herein, an available image portion of a primary image is an image portion that is contained in one of the composite images available to the image reception device. An unavailable (or missing) image portion is an image portion that is not contained in any of the available composite images. Any missing portion of a primary image can be filled with image content obtained by inter- or extrapolation. The inter- or extrapolation may be based on available portions of the primary image (in particular, portions located near the missing portion in the primary image). Alternatively or additionally, the inter- or extrapolation may be based on available portions of one or more of the other N−1 primary images. In particular, if the N primary images have the same size and shape, the inter- or extrapolation may be based on one or more available portions that have the same position as the missing portion, i.e., based on one or more available portions that correspond to the missing portion. Note that image portions of different primary images which are located at the same position (e.g., upper left corner) will generally show the same part of a captured scene and will differ from each other mainly in resolution or blurriness on account of the fact that they are associated with different focus distances (i.e., with different depths).

According to a fourth aspect the disclosure relates to a corresponding image reception method for receiving a set of composite images from an image transmission device. The image reception method comprises the steps of: receiving the set of composite images from the image transmission device, wherein the composite images are based on a set of N primary images, wherein N is greater or equal 2, wherein each of the N primary images has a focus distance associated with it and wherein each of the composite images comprises image portions from two or more of the N primary images; and reconstructing the N primary images from the set of composite images by placing each image portion of each of the composite images into one of the N primary images.

The method according to the fourth aspect of the disclosure can be performed by the image reception device according to the third aspect of the disclosure. Further features of the method according to the fourth aspect of the disclosure result directly from the functionality of the image reception device according to the third aspect of the disclosure and its different implementation forms described above and below.

According to a fifth aspect the disclosure relates to a multifocal display system for displaying a set of N primary images, wherein the multifocal display system comprises an image transmission device according to the first aspect of the disclosure and an image reception device according to the third aspect of the disclosure, wherein the multifocal display system is configured to display the set of N primary images reconstructed by the image reception device. The multifocal display system could be implemented in a near eye three-dimensional (3D) display device.

In a further possible implementation form of the fifth aspect, the multifocal display system is configured to display the reconstructed primary images one after the other. Thus a time-multiplexing scheme can be implemented.

In a further possible implementation form of the fifth aspect, the multifocal display system is configured to display each of the reconstructed primary images with an optical power that conforms to the respective focus distance thereof.

According to a sixth aspect the disclosure relates to a computer program product comprising program code for performing the method according to the second aspect and/or the method according to the fourth aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following illustrative examples of the disclosure are described in more detail with reference to the attached figures and drawings, in which.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the invention may be used. It is understood that embodiments of the invention may be used in other aspects and comprise structural or logical changes not depicted in the figures. The following detailed description, therefore, is not to be taken in a limiting sense, and the scope of the invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
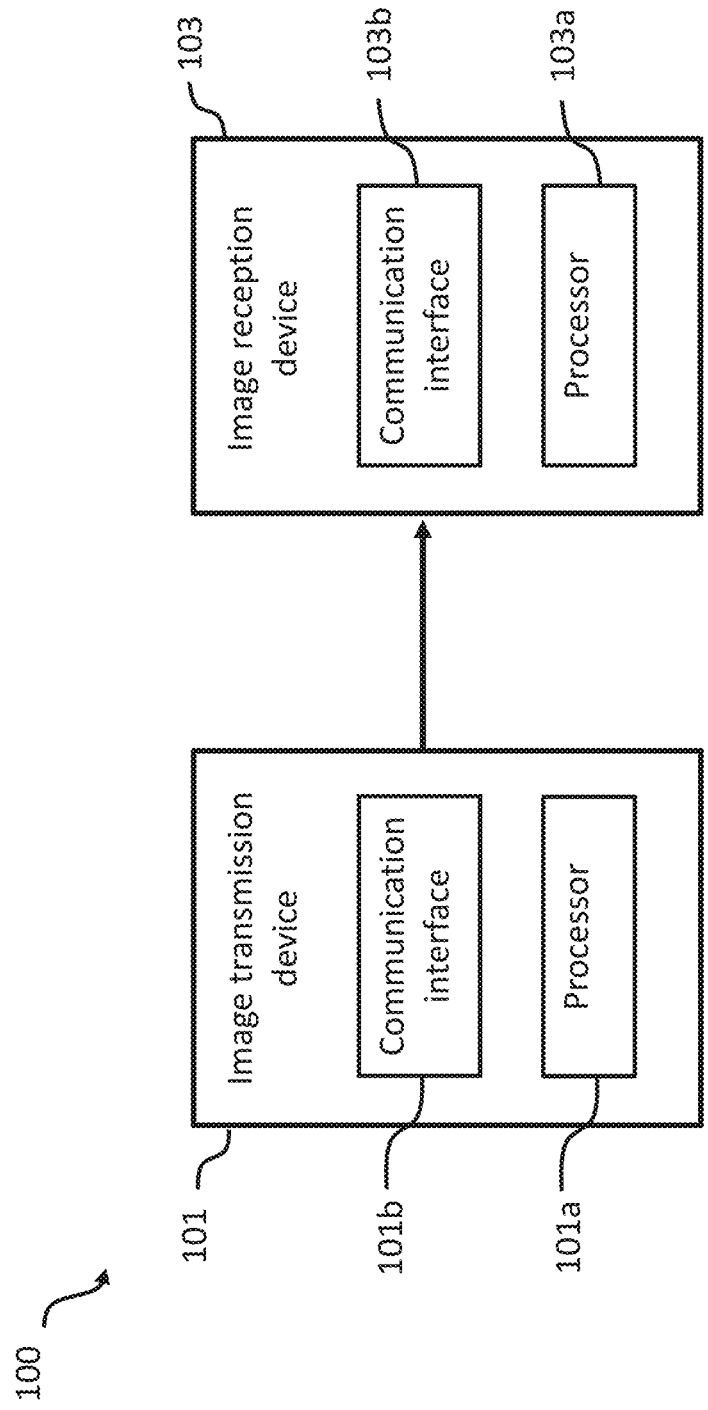
FIG. 1 is a schematic diagram showing an example of a multifocal display system according to an embodiment comprising an image transmission device according to an embodiment and an image reception device according to an embodiment.

FIG. 1 shows an example of a multifocal display system 100 according to an embodiment comprising an image transmission device 101 according to an embodiment and an image reception device 103 according to an embodiment. As will be described in more detail further below, the multifocal display system 100 is configured to display a set of N reconstructed primary images. The multifocal display system 100 is implemented, for example, as part of a near eye three-dimensional (3D) display device. In an illustrative example, the N primary images are images of a video frame. It is understood that the video frame is part of a sequence of video frames. The sequence of video frames provides an animated picture (i.e., a moving picture).

In an illustrative example, the multifocal display system 100 is configured to display the reconstructed primary images one after the other. Thus, the multifocal display system 100 can implement a time-multiplexing image display scheme.

Figure 3:
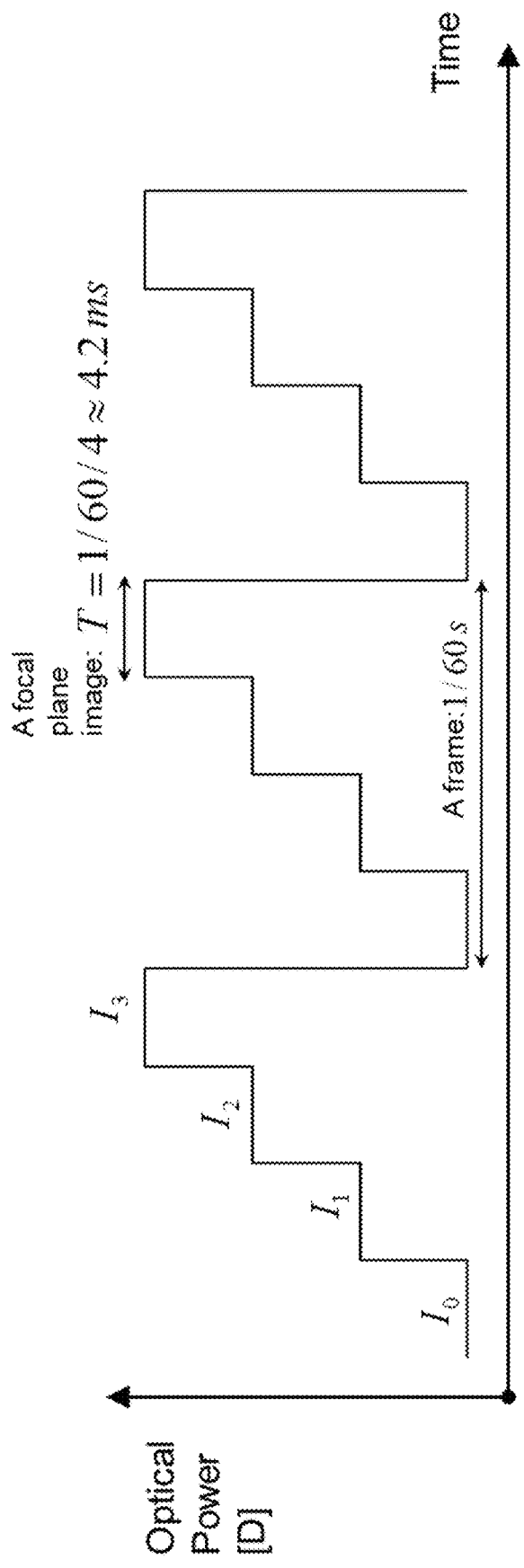
FIG. 3 is a schematic diagram illustrating a display scheme implemented in a multifocal display system according to an embodiment.

As illustrated in FIG. 3, in an illustrative example, the multifocal display system 100 is configured to display each of the reconstructed primary images with an optical power that conforms to the respective focus distance. By way of example, an image sequence $I_o$, $I_1$, $I_2$, $I_3$, which corresponds to a certain depth sequence represented by a staircase function (of optical power), can be sequentially displayed within a time period of ⅟60 s.

Figure 2:
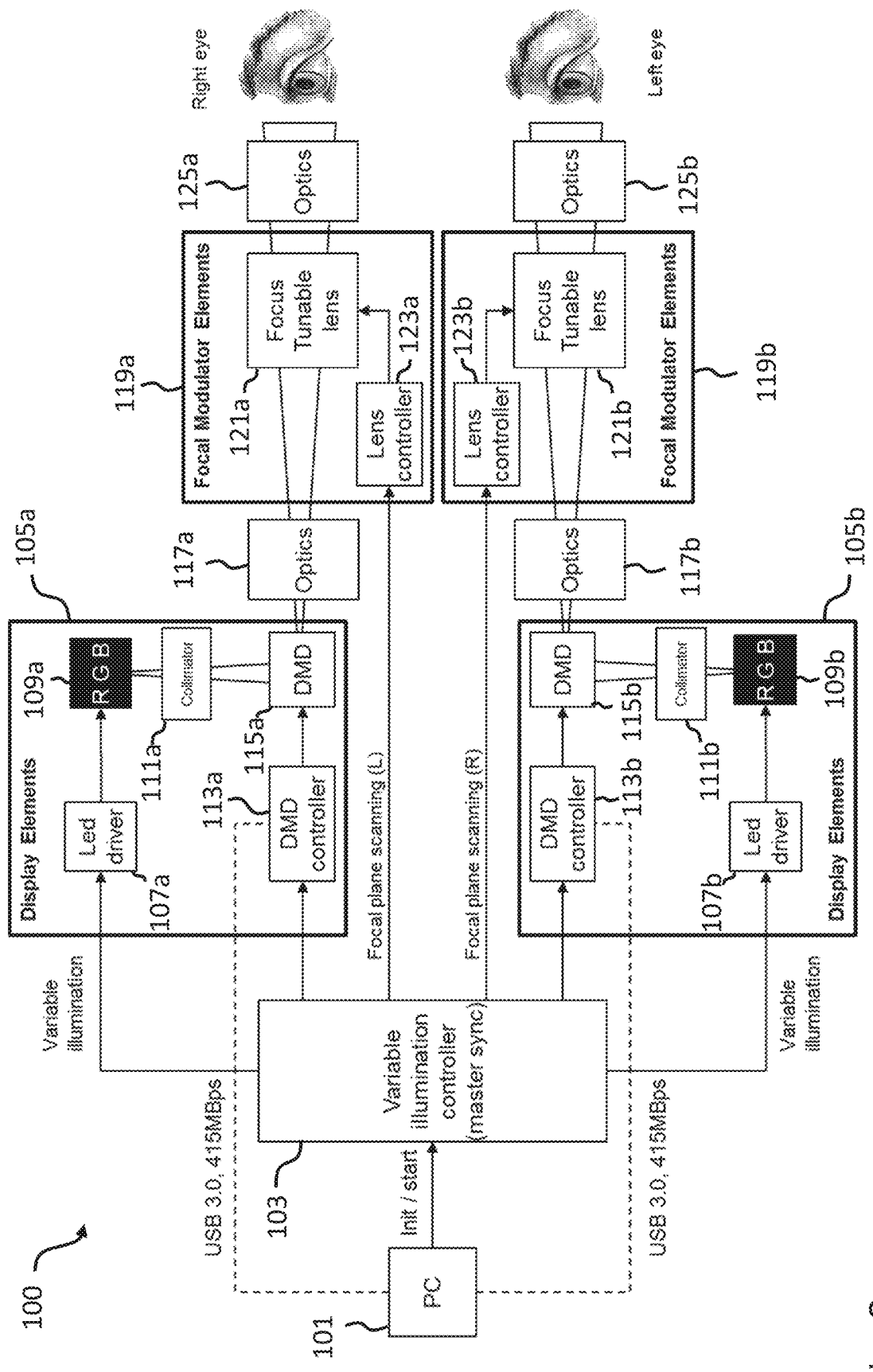
FIG. 2 is a schematic diagram showing a further example of a multifocal display system according to an embodiment comprising an image transmission device according to an embodiment and an image reception device according to an embodiment.

In an illustrative example, the multifocal display system 100 comprises the image transmission device 101 and the image reception device 103 implemented as illustrated in FIG. 2. The multifocal display system 100 shown in FIG. 2 comprises the image transmission device 101 in the form of a personal computer 101, and the image reception device 103 is provided in the form of a display controller 103 as well as two optical branches for generating and displaying images. In the illustrative example depicted in FIG. 2, respective displays 105a, 105b comprise LED drivers 107a, 107b, RGB units 109a, 109b, collimators 111a, 111b, DMDs 115a, 115b, and DMD controllers 113a, 113b. Via optical elements 117a, 117b, the respective images provided by the displays 105a, 105b are provided to respective focal modulator elements 119a, 119b. In the illustrative example depicted in FIG. 2, the respective focal modulator elements 119a, 119b comprise a focus tunable lens 121a, 121b as well as a lens controller 123a, 123b. Via further optical elements 125, 125b, the respective images are provided from the focal modulator elements 119a, 119b to the right and left eye of a user. As will be appreciated, the displays 105a and 105b can be responsible for generating the images, whereas the focal modulator elements 119a and 119b are responsible for generating the optical power related to the output images provided by the displays 105a and 105b.

As will be described in more detail further below, the image transmission device 101, i.e., the image source of the multifocal display system 100, is configured to transmit a set of N composite images based on a set of N primary images via a potentially error prone communication channel to the image reception device 103, e.g. a display controller 103 of the multifocal display system 100 with N greater than or equal 2. Each of the N primary images has a focus distance associated with it. The image reception device 103, e.g. the display controller 103 of the multifocal display system 100, is configured to receive a set of composite images from the image transmission device 101.

Figure 4A:
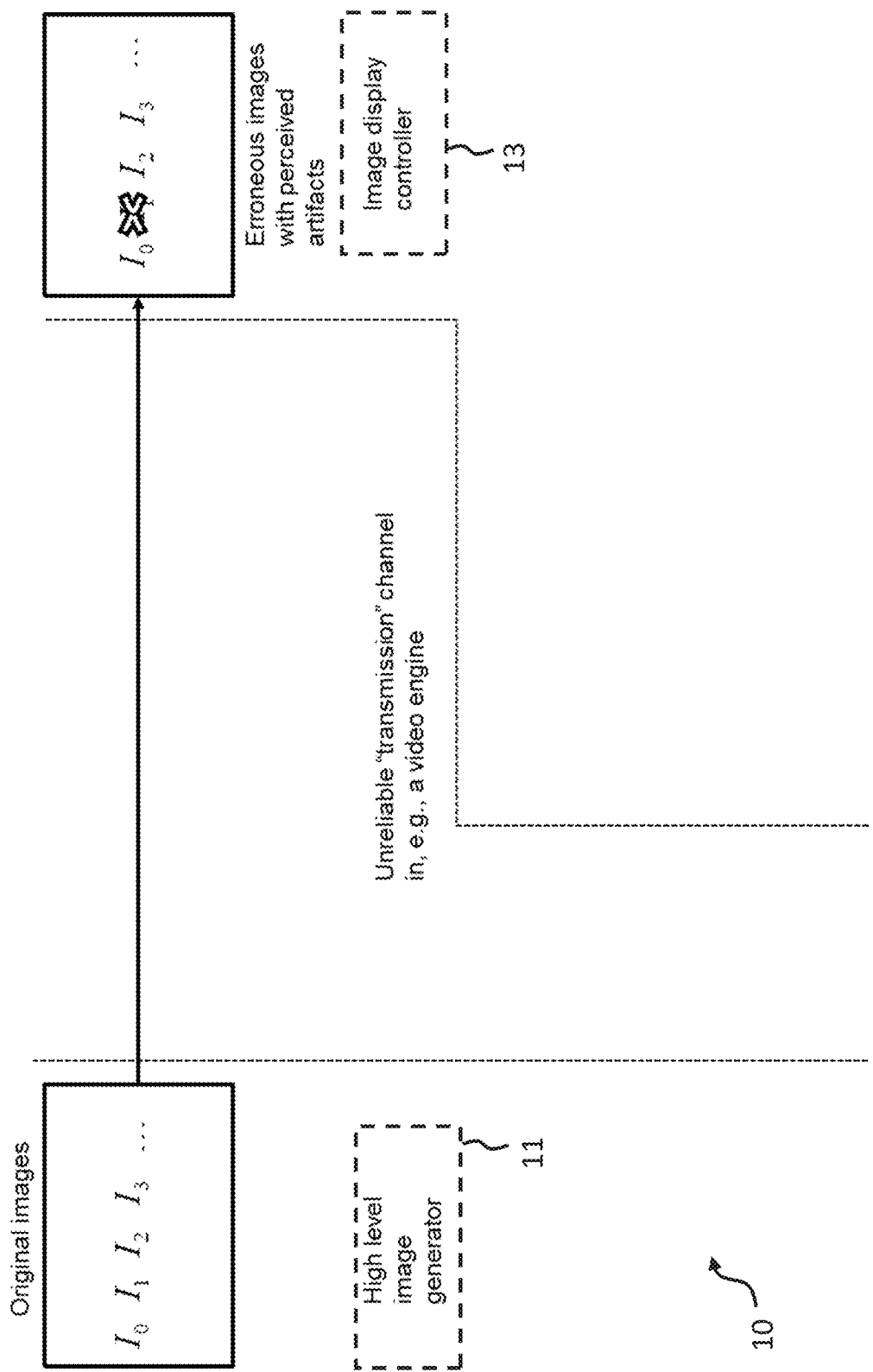
FIG. 4a is a schematic diagram showing an example of a conventional multifocal display system.

In order to provide a better understanding of the invention FIG. 4a illustratively depicts a conventional time-multiplexed multifocal display system 10 with an image generator 11 and a display controller 13. By way of example, a sequence of four focal-plane images $I_o$, $I_1$, $I_2$, $I_3$, which corresponds to N=4 depths, is sent from the image generator 11 to the display controller 13. Each of the four images $I_o$, $I_1$, $I_2$, $I_3$ will normally comprise some out-of-focus (or blurred or diffuse) regions, which are regions with depths different from the depth of the image in question. Differently put, if a region in one of the images (e.g., in to) is focused (i.e., the region is filled with the correct depth), the same geometric region in each of the other three images (e.g., in $I_1$, $I_2$, $I_3$) will be out-of-focus (i.e., blurred or diffuse). Illustrative examples of the present disclosure make advantageous use of this finding. In the exemplary scenario illustrated in FIG. 4a, image $I_1$ is lost due to an error in the transmission channel. This results in a severe artifact when displayed by the display controller 13 of the conventional multifocal display system 10, since an image which corresponds to a certain depth is completely missing.

In order to overcome this limitation, as can be taken from FIG. 1, the image transmission device 101 of the multifocal display system 100 comprises processing circuitry, in particular one or more processors 101a that are configured to partition each of the N primary images into a plurality of image portions and generate the N composite images by placing each image portion of each of the N primary images into one of the N composite images, such that each of the N composite images comprises image portions from two or more of the N primary images. In an illustrative example, the plurality of image portions of the N primary images can have a rectangular or quadratic shape. In an embodiment, a least some of the plurality of image portions of the N primary images are provided by pixels. Moreover, the image transmission device 101 comprises a communication interface 101b configured to transmit the N composite images to the image reception device 103.

Likewise, the image reception device 103 comprises a communication interface 103b configured to receive the set of composite images from the image transmission device 101, wherein the composite images are based on the set of N primary images and wherein each of the composite images received by the image reception device 103 comprises image portions from two or more of the N primary images. Moreover, the image reception device 103 comprises processing circuitry 103a, e.g. one or more processors 103a, configured to reconstruct the N primary images from the set of composite images by placing each image portion of each of the composite images into one of the N primary images.

Figure 4B:
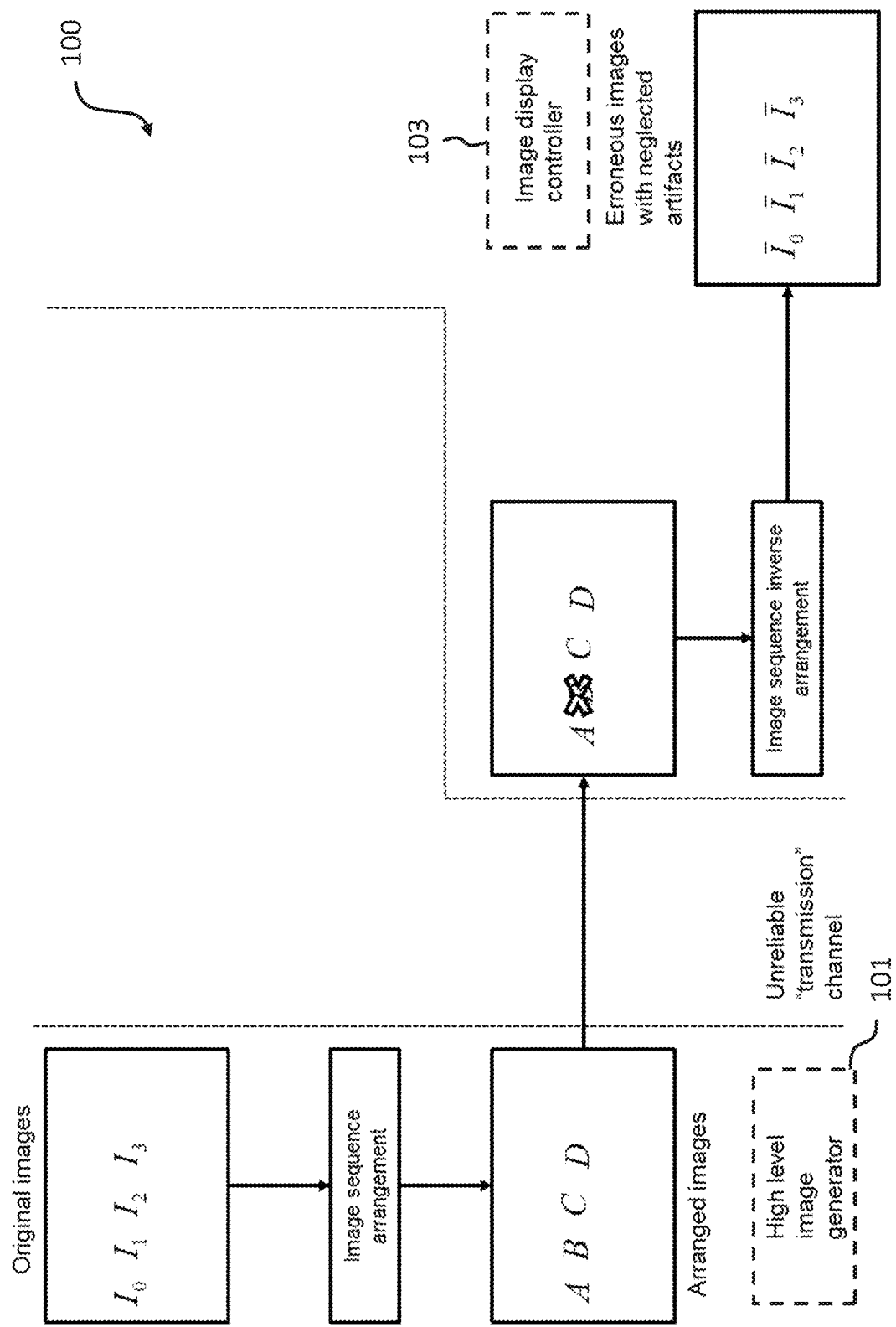
FIG. 4b is a schematic diagram showing a further example of a multifocal display system according to an embodiment comprising an image transmission device according to an embodiment and an image reception device according to an embodiment.

FIG. 4b illustratively depicts the same scenario as in FIG. 4a in the context of the multifocal display system according to an illustrative example comprising the image transmission device 101 and the image reception device 103. In the exemplary scenario of FIG. 4b the N=4 primary images $I_o$, $I_1$, $I_2$, $I_3$ have been processed by the processing circuitry 101a (referred to as image sequence arrangement processor in FIG. 4b) of the image transmission device 101 to generate a sequence of N composite images denoted by A, B, C, D. When the same error as in the scenario of FIG. 4a happens in the scenario of FIG. 4b, the processing circuitry 103a (referred to as image sequence inverse arrangement in FIG.

4b) decode the remaining received images into a sequence of 4 reconstructed primary images. As will be appreciated, these reconstructed primary images will likely contain error due to a missing part of the images, but the perceived quality will be much better in comparison to the scenario illustratively depicted in FIG. 4a.

Thus, as illustratively depicted in FIG. 4b, the image transmission device 101 is configured to distribute the content of the N primary images over the N composite images. When no composite image is lost or corrupted during transmission, the set of composite images available to the image reception device 103 will comprise the N composite images provided by the image transmission device 101 (and thus the whole image content of the N primary images). The image reception device 103 can then reconstruct the N primary images from the N available composite images exactly (i.e., with no loss in image quality). When one or more composite images are lost or corrupted (e.g., in the course of transmitting them to the image reception device 103), these lost or corrupted composite images will not be available for reconstructing the primary images. In this case (i.e., when the set of composite images available to the image reception device 103 comprises one or more but not all of the N composite images sent by the image transmission device 101), the image reception device 103 can reconstruct the N primary images from the set of available composite images in an approximate manner (e.g., by inter- or extrapolation).

Thus, in an illustrative example, the processing circuitry 103a of the image reception device 103 is configured to reconstruct the N primary images in an approximate manner from the set of composite images provided by the image transmission device 101, when the set of composite images includes one or more but less than N composite images (i.e., in a case where not all N composite images generated and transmitted by the image transmission device 101 have been received by the image reception device 103 or in a case where the composite images have been corrupted).

In an illustrative example, the processing circuitry 103a of the image reception device 103 is configured to reconstruct the N primary images in an approximate manner by reconstructing a missing image portion of one of the N primary images based on one or more available image portions. As used herein, an available image portion of a primary image is an image portion that is contained in one of the composite images available to the image reception device 103. An unavailable (or missing) image portion is an image portion that is not contained in any of the available composite images. Any missing portion of a primary image is filled by the processing circuitry 103a of the image reception device 103 with image content obtained by inter- or extrapolation. The interpolation or extrapolation may be based on available portions of the primary image (in particular, portions located near the missing portion in the primary image). Alternatively or additionally, the interpolation or extrapolation may be based on available portions of one or more of the other N−1 primary images. In particular, if the N primary images have the same size and shape, the interpolation or extrapolation may be based on one or more available portions that have the same position as the missing portion (i.e., based on one or more available portions that correspond to the missing portion. Note that image portions of different primary images which are located at the same position (e.g., upper left corner) will generally show the same part of a captured scene and will differ from each other mainly in resolution or blurriness on account of the fact that they are associated with different focus distances (i.e., with different depths).

In an illustrative example, the processing circuitry 101a of the image transmission device 101 is configured to place the image portions of the N primary images into the composite images such that each composite image comprises image portions from all the N primary images. In an illustrative example, the N primary images are identical in size and shape.

In an illustrative example, the processing circuitry 101a of the image transmission device 101 is configured to place any two image portions of any one of the N primary images into different composite images if the two image portions are adjoining image portions. In other words, adjoining image portions of a primary image can be placed into different composite images. Two image portions are considered adjoining if they share a common boundary. Two image portions which share merely a point (e.g., a corner point) are not considered adjoining. Thus, if one the two image portions is lost or corrupted (e.g., due to loss or corruption of the composite frame which contains this image portion), the other image portion can be reconstructed by the image reception device 103 by interpolation or extrapolation of neighboring image portions contained in composite frames that have not been lost or are not corrupted.

In an illustrative example, the communication interface 101b of the image transmission device 101 is configured to transmit the N composite images in a predefined sequence to the image reception device 103. This allows the image reception device to identify each composite image based on the position of that composite image in the received sequence of composite images, and no further information for distinguishing the composite images from each other needs to be provided to the image reception device 103. In an illustrative example, the N primary images are images of a video frame, the video frame is an element of a sequence of video frames, and the predefined sequence is the same in every frame of the sequence of video frames.

In an illustrative example, the processing circuitry 101a of the image transmission device 101 is configured to place any two corresponding image portions of any two of the N primary images into different composite images. This facilitates reconstruction of the primary images by the image reception device 103 when the set of composite images available to the image reception device 103 is incomplete (i.e., when not all of the N composite images have been received by the image reception device 103).

In an illustrative example, the N primary images are identical in size and shape, wherein the processing circuitry 101a of the image transmission device 101 is configured to partition the N primary images into image portions in the same manner. In other words, the geometrical layout of image portions can be the same in each of the N primary images. Each image portion of each of the N composite images can thus be filled with the corresponding image portion of one of the N primary images.

In an illustrative example, the processing circuitry 101a of the image transmission device 101 is configured to place each image portion of each of the primary images at the same position within the composite image as in the primary image, which allows a simple and efficient transformation from primary to composite images.

Figure 5A:
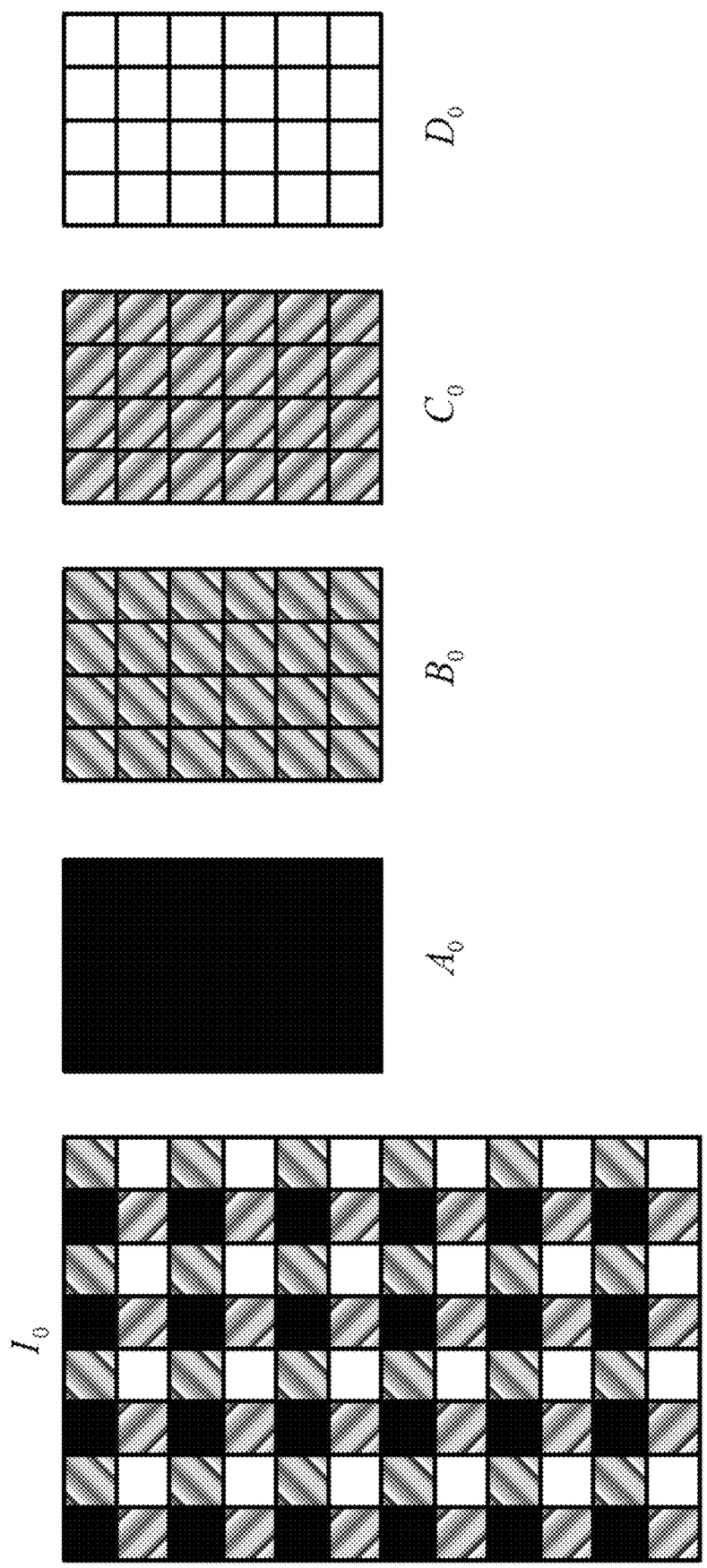
FIG. 5a is a diagram illustrating portions of exemplary composite images generated by an image transmission device according to an embodiment.
Figure 5B:
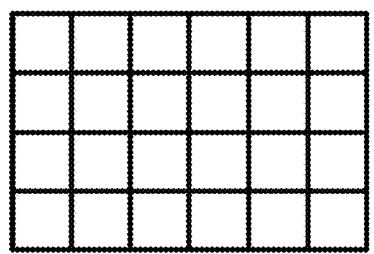
FIG. 5b is a diagram illustrating portions of exemplary composite images generated by an image transmission device according to an embodiment.
Figure 5B:
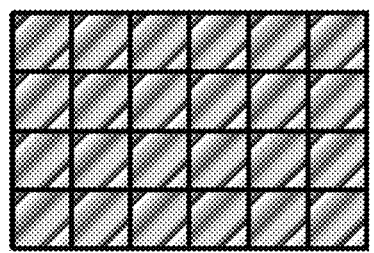
Figure 5B:
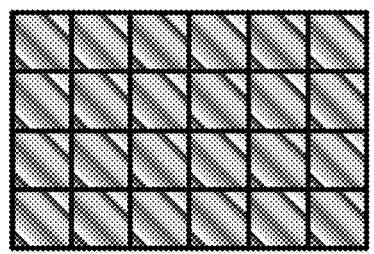
Figure 5B:
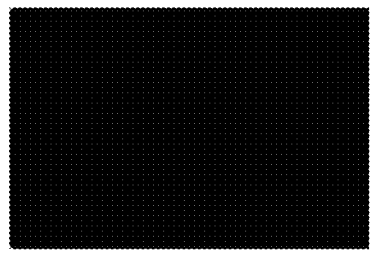
Figure 5B:
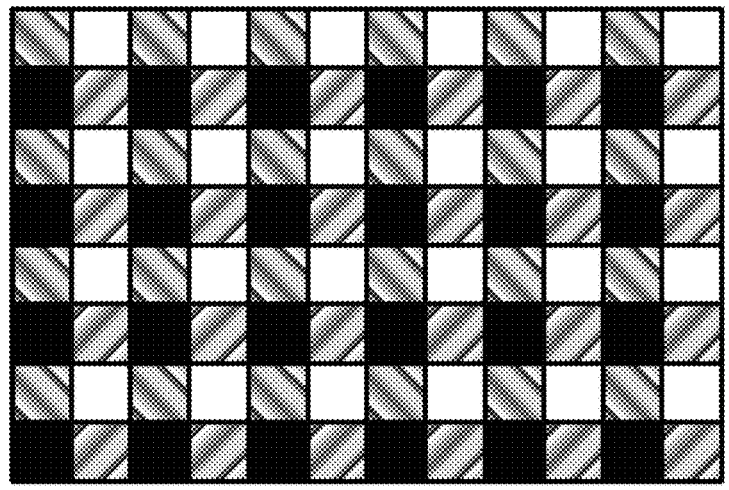
Figure 6A:
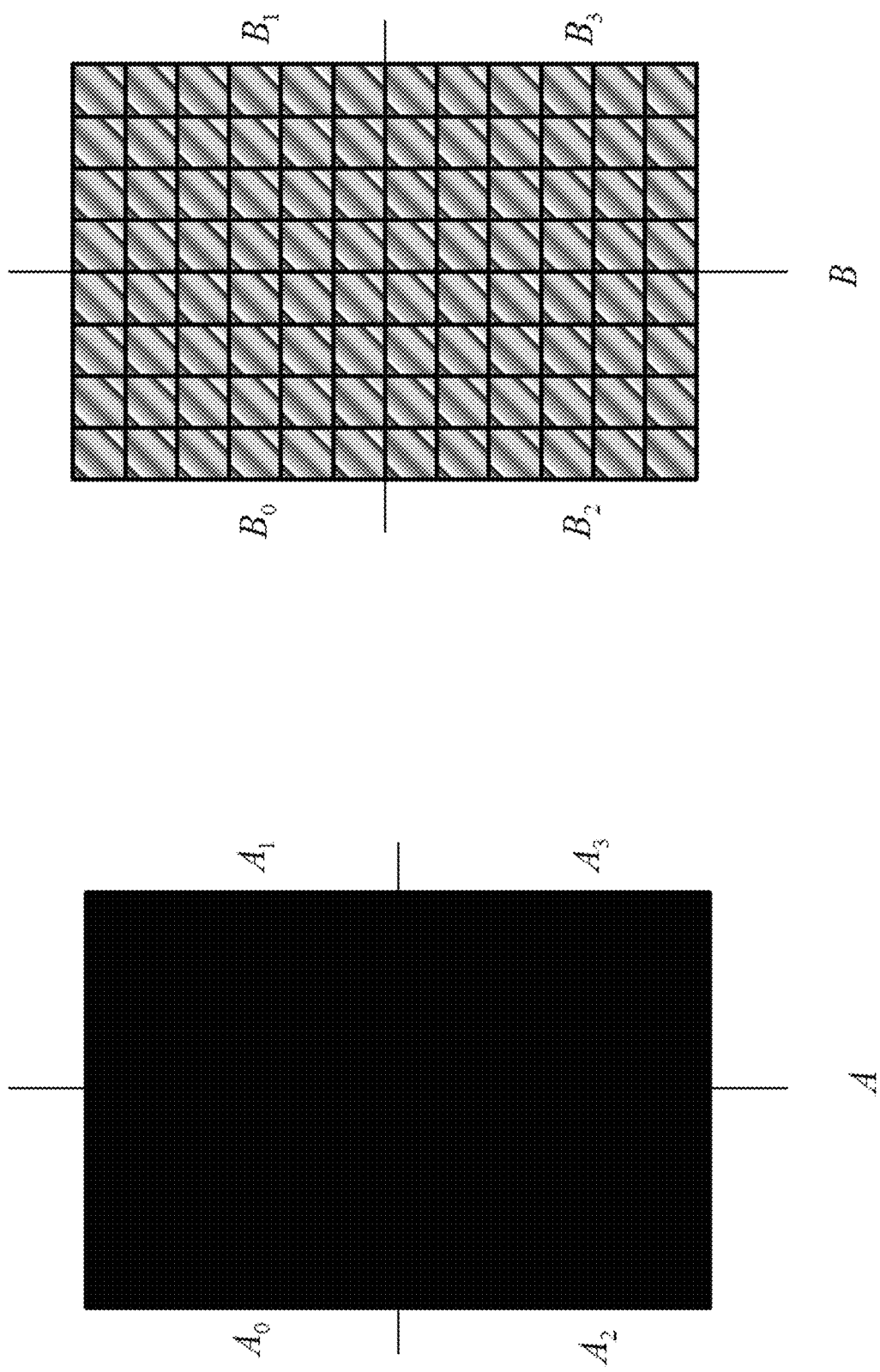
FIG. 6a is a diagram illustrating exemplary composite images generated by an image transmission device according to an embodiment.
Figure 6B:
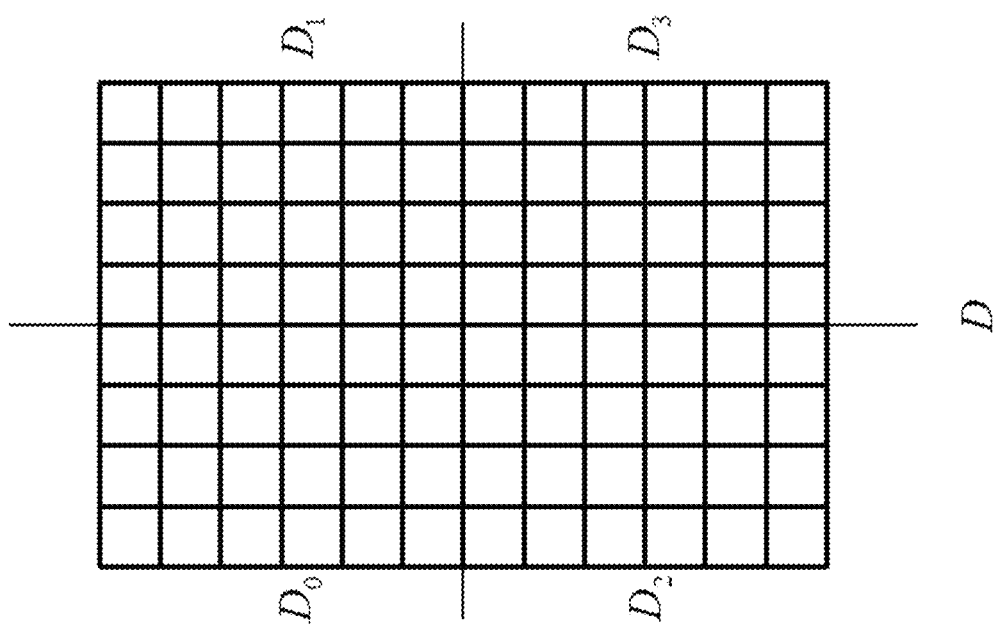
FIG. 6b is a diagram illustrating exemplary composite images generated by an image transmission device according to an embodiment.
Figure 6B:
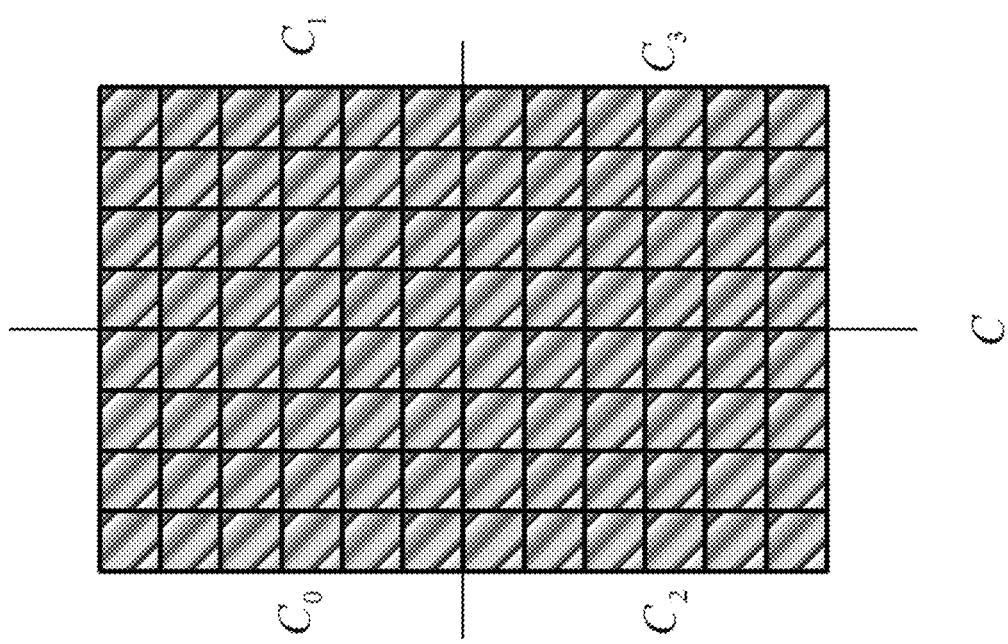

FIGS. 5a and 5b illustratively depict two exemplary primary images $I_1$, $I_2$ as well as respective portions $A_o$, $B_o$, $C_o$, $D_o$ and $A_1$, $B_1$, $C_1$, $D_1$ of the composite images A, B, C, D generated by the image transmission device 101 and possibly received by the image reception device 103. Given N=4 primary images $I_o, I_1, I_2, I_3$ in a sequence, a sequence of composite images A, B, C, D is generated by distributing the primary images $I_o, I_1, I_2, I_3$ across the composite images A, B, C, D such that each of the primary images is spread across two or more (preferably, all) of the composite images A, B, C, D. For example, as shown in FIG. 5a, each of the composite images A, B, C, D comprises a first portion $A_o$, $B_o$, $C_o$, $D_o$, which is a collection of parts or blocks of the first primary image to as indicated by the respective texture. The same applies to the second original image $I_1$ as shown in FIG. 5b. All parts of the composite images are then combined to form a sequence of composite images A, B, C, D as shown in FIGS. 6a and 6b. In this way, when, for instance, the composite image B is lost or corrupted during the transmission, the sequence of primary images reconstructed by the image reception device 103 on the basis of the composite images A, C and D can limit the artifact caused by the loss or corruption of composite image B.

Figure 7:
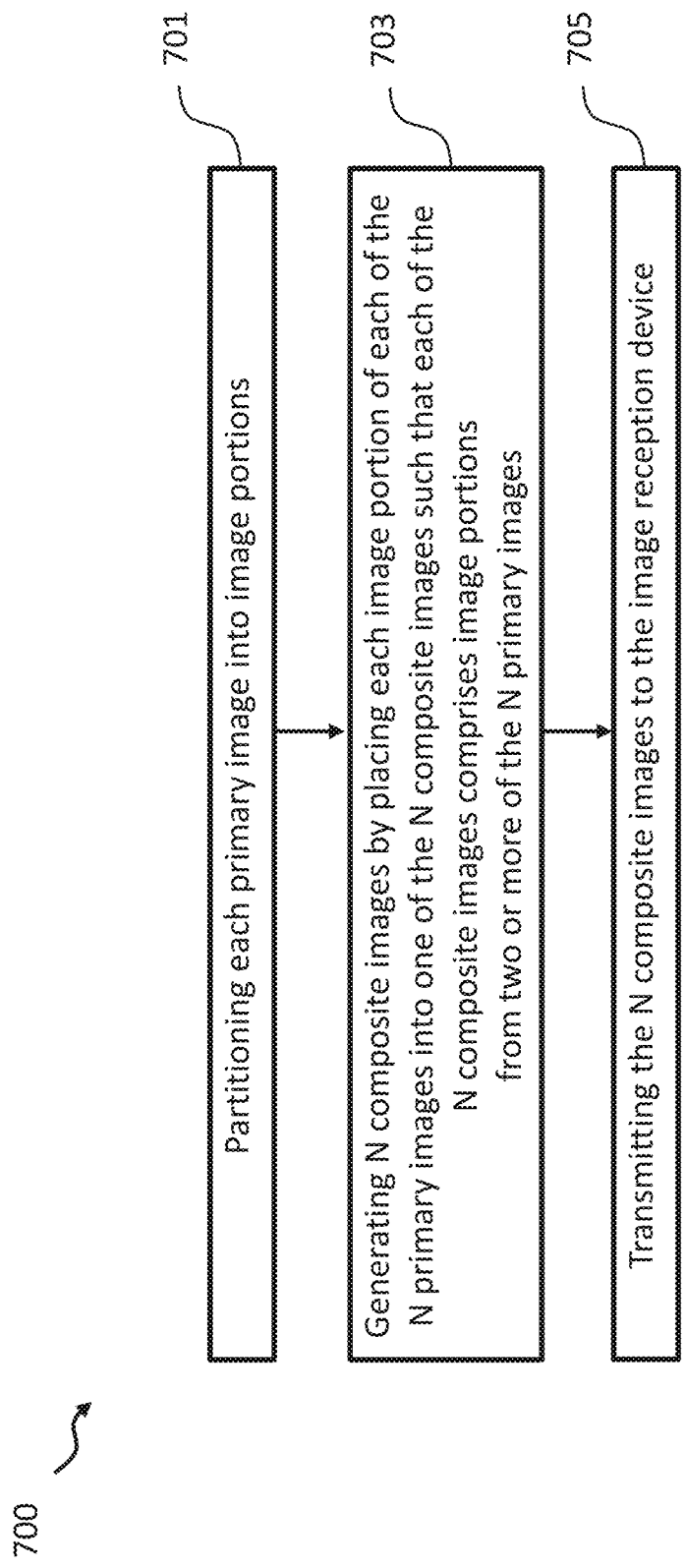
FIG. 7 is a flow diagram showing an example of an image transmission method according to an embodiment.

FIG. 7 is a flow diagram showing an example of an image transmission method for transmitting a set of N composite images based on a set of N primary images from the image transmission device 101 of the multifocal display system 100 to the image reception device 103 thereof according to an illustrative example. The image transmission method 700 comprises the steps of: partitioning 701 each of the N primary images into image portions; generating 703 the N composite images by placing each image portion of each of the N primary images into one of the N composite images such that each of the N composite images comprises image portions from two or more of the N primary images; and transmitting 705 the N composite images to the image reception device 103.

Figure 8:
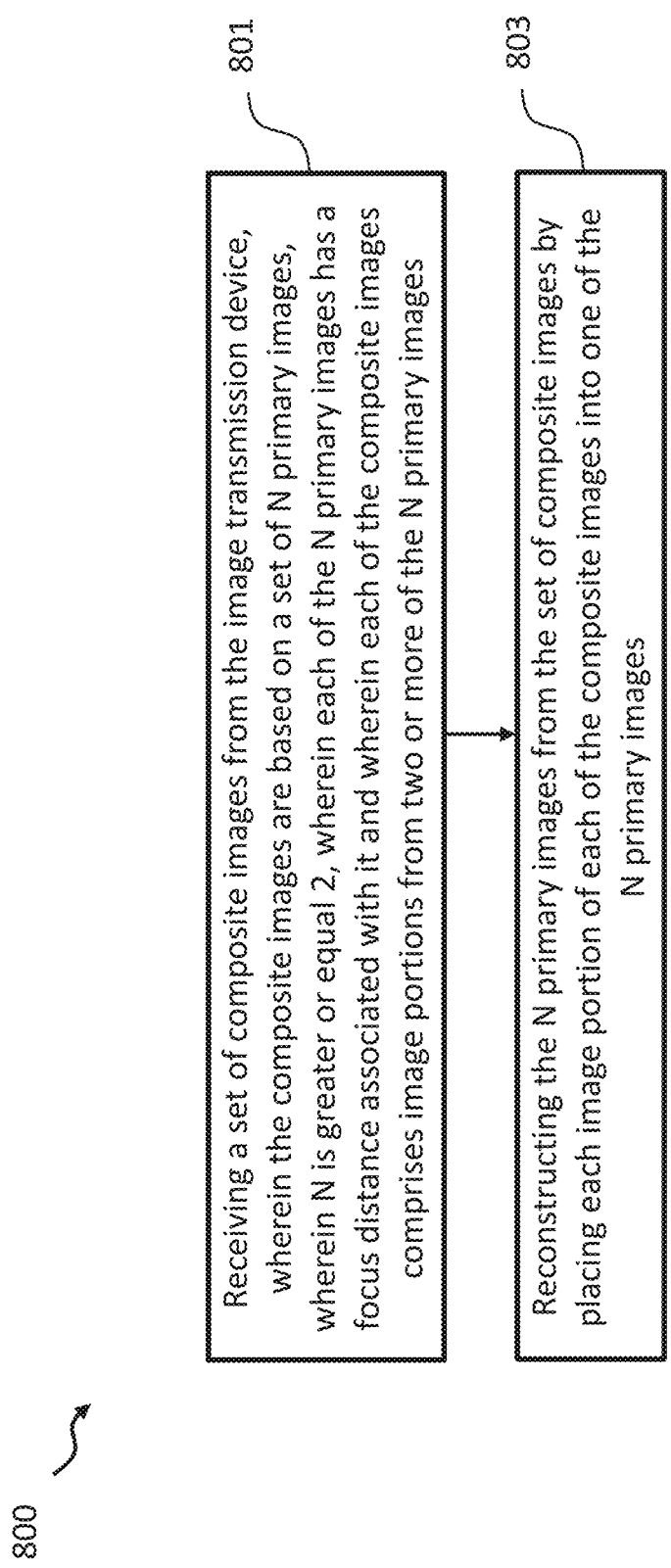
FIG. 8 is a flow diagram showing an example of an image reception method according to an embodiment.

FIG. 8 is a flow diagram showing an example of a corresponding image reception method 800 for receiving the set of composite images from the image transmission device 101 at the image reception device 103 of the multifocal display system 100 according to an illustrative example. The image reception method 800 comprises the steps of: receiving 801 the set of composite images from the image transmission device 101, wherein the composite images are based on a set of N primary images, wherein N is greater or equal 2, wherein each of the N primary images has a focus distance associated with it and wherein each of the composite images comprises image portions from two or more of the N primary images; and reconstructing 803 the N primary images from the set of composite images by placing each image portion of each of the composite images into one of the N primary images.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

In the several illustrative example provided in the present disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

What is claimed is:

1. An image transmission device for transmitting a set of N composite images, for rendering N reconstructed primary images on a multifocal display (MFD) device, based on a set of N primary images, wherein N is greater or equal to 2, wherein the N primary images are two-dimensional images of a same three-dimensional video frame and each of the N primary images has a different associated focus distance, and wherein the image transmission device comprises:
   a processing circuitry configured to carry out operations of:
      partitioning each of the N primary images into image portions, and
      generating the N composite images by placing each image portion of each of the N primary images into one of the N composite images such that each composite image, of the N composite images, comprises image portions from two or more of the N primary images; and
   a communication interface configured to carry out transmitting the N composite images to the MFD device for rendering the N reconstructed primary images on the MFD device,
   wherein the N primary images are identical in size and shape,
   wherein the processing circuitry is configured to partition, during the partitioning, the N primary images into image portions in a same manner, and
   wherein the processing circuitry is configured to place each image portion of each of the primary images at the same position within the composite image as in a primary image of the N primary images.

2. The image transmission device of claim 1, wherein the processing circuitry is configured to place any two image portions of any one of the N primary images into different composite images in accordance with the two image portions being adjoining image portions.

3. The image transmission device of claim 1, wherein the communication interface is configured to transmit, during the transmitting, the N composite images in a predefined sequence to the image reception device.

4. The image transmission device of claim 1, wherein the processing circuitry is configured to place any two corresponding image portions of any two of the N primary images into different composite images.

5. The image transmission device of claim 1, wherein the image portions of the N primary images have a rectangular or quadratic shape.

6. The image transmission device of claim 1, wherein the image portions of the N primary images are pixels.

7. An image transmission method for transmitting a set of N composite images, for rendering N reconstructed primary images on a multifocal display (MFD) device, based on a set of N primary images, wherein N is greater or equal 2, wherein the N primary images are two-dimensional images of a same three-dimensional video frame and each of the N primary images has a different associated focus distance, wherein the image transmission method comprises:
- partitioning each of the N primary images into image portions;
- generating the N composite images by placing each image portion of each of the N primary images into one of the N composite images such that each composite image, of the N composite images, comprises image portions from two or more of the N primary images; and
- transmitting the N composite images to the MFD device for rendering the N reconstructed primary images on the MFD device,
- wherein the N primary images are identical in size and shape,
- wherein, during the partitioning, the N primary images are partitioned into image portions in a same manner, and
- wherein each image portion of each of the primary images is placed at the same position within the composite image as in a primary image of the N primary images.

8. An image reception device for receiving a set of composite images, for rendering on a multifocal display (MFD) device, from an image transmission device, wherein the image reception device comprises:
- a communication interface configured to receive the set of composite images from the image transmission device, wherein the composite images are based on a set of N primary images, wherein N is greater or equal 2, wherein the N primary images are two-dimensional images of a same three-dimensional video frame and each primary image, of the N primary images, has a different associated focus distance, and wherein each composite image, of the composite images, comprises image portions from two or more of the N primary images; and
- a processing circuitry configured to reconstruct the N primary images, for display on the MFD device, from the set of composite images by placing each image portion of each of the composite images into at least one of the N reconstructed primary images,
- wherein the N primary images are identical in size and shape,
- wherein the N primary images are partitioned into the image portions in a same manner, and
- wherein each image portion of each of the primary images is placed at the same position within the composite image as in a primary image of the N primary images.

9. The image reception device of claim 8, wherein the processing circuitry is configured to reconstruct the N primary images in an approximate manner from the set of composite images in accordance with the set of composite images including one or more, but less than N, composite images.

10. The image reception device of claim 9, wherein the processing circuitry is configured to reconstruct the N primary images in an approximate manner by reconstructing a missing image portion of one of the N primary images based on one or more available image portions.

11. The image reception device of claim 10, wherein the processing circuitry is configured to reconstruct the missing portion of one of the N primary images based on available portions of one or more of the other N-1 primary images that have the same position as the missing portion in the three dimensional video frame, but are associated with a different focus distance.

12. An image reception method for receiving a set of composite images, for rendering on a multifocal display (MFD) device, from an image transmission device, wherein the image reception method comprises:
- receiving the set of composite images from the image transmission device, wherein the composite images are based on a set of N primary images, wherein N is greater or equal 2, wherein the N primary images are two-dimensional images of a same three-dimensional video frame and wherein each of the N primary images has a different associated focus distance, and wherein each composite image, of the composite images, comprises image portions from two or more of the N primary images; and
- reconstructing the N primary images, for display on the MFD device, from the set of composite images by placing each image portion of each of the composite images into at least one of the N reconstructed primary images,
- wherein the N primary images are identical in size and shape,
- wherein the N primary images are partitioned into the image portions in a same manner, and
- wherein each image portion of each of the primary images is placed at the same position within the composite image as in a primary image of the N primary images.

* * * * *